United States Patent [19]
Takeshita et al.

[11] 3,890,253
[45] June 17, 1975

[54] REVERSIBLY CROSSLINKED POLYMERS

[75] Inventors: Yasuhiro Takeshita; Michitake Uoi; Yoshiyuki Hirai; Mitsuru Uchiyama, all of Chiba, Japan

[73] Assignee: Idemitsu Kosan Co. Ltd., Tokyo, Japan

[22] Filed: Feb. 27, 1974

[21] Appl. No.: 446,502

Related U.S. Application Data

[62] Division of Ser. No. 210,834, Dec. 22, 1971, Pat. No. 3,826,760.

[30] Foreign Application Priority Data

| Dec. 26, 1970 | Japan | 45-128474 |
| Dec. 26, 1970 | Japan | 45-128475 |
| Sept. 29, 1971 | Japan | 46-75427 |
| Sept. 29, 1971 | Japan | 46-75428 |

[52] U.S. Cl. ............ 260/2 A; 260/2 BP; 260/80 P; 260/88.3 A
[51] Int. Cl. ............................................. C08g 23/20
[58] Field of Search .... 260/2 A, 2 BP, 80 P, 88.3 A

[56] References Cited
UNITED STATES PATENTS

| 3,645,917 | 2/1972 | Vandenberg | 260/2 A |
| 3,817,876 | 6/1974 | Fukutani et al | 260/2 A |

*Primary Examiner*—Morris Liebman
*Assistant Examiner*—E. A. Nielsen
*Attorney, Agent, or Firm*—William J. Daniel

[57] ABSTRACT

Reversible cross-linking is imparted to polymers and copolymers, especially of the vinyl, olefinic, and olefinic oxide types by means of recurring dicyclopentadiene linkages. Difunctional dicyclopentadiene compounds can be polymerized directly into homopolymers or polymerized with comonomers to form copolymers. Alternatively, polymers carrying cyclopentadiene substituents can be prepared and the dimerization of the cyclopentadiene groups effected in situ to produce the cross-linkages. The dicyclopentadiene cross-linkages cleave on heating to a sufficient temperature so that the present polymers and copolymers have a thermoplastic character notwithstanding their normal cross-linked network structure.

2 Claims, 7 Drawing Figures

REVERSIBLY CROSSLINKED POLYMERS

This is a division, of Ser. No. 210,834, filed Dec. 22, 1971, now U.S. Pat. No. 3,826,760 issued July 30, 1974.

This invention relates to thermoplastic composition comprising novel cross-linked polymers or copolymers, to a process for producing the plastics, to a shaping process using the plastics and the shaped articles. In other aspects, this invention relates to a novel linear polymer or copolymer that is a precursor of the cross-linked polymers or copolymers and to a process for producing the linear polymer or copolymer.

Plastics have been used widely as one of the most important materials in a variety of fields. It is well known that plastics are classified into thermosetting plastics and thermoplastic plastics and that both kinds of plastics are largely different in their properties.

Thermosetting plastics are converted by heating into insoluble and infusible substances, thus giving products excellent in chemical resistance, heat-resistance and dimensional stability, but are inferior in workability and workin efficiency. On the other hand, thermoplastic plastics are easily softened by heating and are soluble in various organic solvents, thus attaining good workability and high working efficiency, but are inferior in heat-resistance, chemical resistance and dimensional stability. The difference in the properties between both kinds of plastics is ascribable to the fact that moldings of thermosetting plastics normally have a complicated network structure, while moldings of thermoplastic plastics have a linear structure. If there are plastics which have a network structure and are easily shaped by heating, they will possess the merits of both kinds of plastics. Such plastics have earnestly been desired in the plastic industry for a long time.

Various researches have been made with a purpose of development of plastics which have a cross-linking structure and which can easily be shaped by heating and have now found that polymers or copolymers having a network structure cross-linked through dicyclopentadiene rings are temporarily cleaved to be plasticized at cross-linkages by heating at a certain temperature, but such cross-linkages are reformed to reinstate the network structure when the heated polymers or copolymers are cooled. Such polymers or copolymers cross-linked through dicyclopentadiene rings are novel substances which have not been described in literatures.

Thus, it is an object of this invention to provide thermoplastic plastics comprising polymers or copolymers cross-linked through dicyclopentadiene rings. It is another object of this invention to provide a process for producing polymers or copolymers having a substantially network structure cross-linked through dicyclopentadiene rings.

It is a further object of this invention to provide a shaped method for manufacturing shaped articles effectively from the thermoplastic plastics.

It is still another object of this invention to provide shaped articles of the thermoplastic plastics.

It is a further object of this invention to provide new linear polymers or copolymers which are precursors of the cross-linked polymers or copolymers.

It is still a further object of this invention to provide a process for producing the linear polymers or copolymers.

These and other objects of this invention will become apparent as the description proceeds.

The aforementioned objects can be attained by practicing this invention as will be stated hereinafter.

The thermoplastic plastics of this invention comprise polymers or copolymers having a substantially network structure cross-linked through dicyclopentadiene rings of the formula:

A preferred example of the thermoplastics of this invention is a polymer or copolymer having a recurring cross-linked structure unit of the general formula:

wherein:
$R_1$, $R_2$ and $R_3$ each represent hydrogen atom or a lower alkyl group,
X is $-CH_2-$ or radical,
A and A' each represent a substituted or unsubstituted lower alkylene or oxyalkylene group, $m$ and $m'$ are zero or a positive integer of at least 1.

The cross-linked polymers or copolymers are produced by the two different processes as will be described hereinafter.

One process for producing the cross-linked polymers or copolymers comprises dimerizing a cyclopentadiene compound having an olefinically unsaturated group or glycidyl group to form a dicyclopentadiene compound having two olefinically unsaturated groups or glycidyl groups and then copolymerizing the dicyclopentadiene compound alone or in mixture with other copolymerizable olefinically unsaturated compounds or glycidyl compounds. The cyclopentadiene compounds having an olefinically unsaturated group or glycidyl group which are utilizable as starting material in this process include cyclopentadienes substituted by an alkenyl group, such as allylcyclopentadiene or methallylcyclopentadiene; alkenyl esters of a carboxylic acid having cyclopentadiene ring, such as vinyl cyclopentadiene carboxylate or allyl cyclopentadiene carboxylate; cyclopentadienyl esters of a carboxylic acid having an olefinically unsaturated group, such as cyclopentadienyl acrylate or cyclopentadienyl methacrylate; and glycidyl compounds such as glycidylcyclopentadiene, glycidyl cyclopentadienecarboxylate or cyclopentadienyl glycidate. If desired, the cyclopentadiene ring in these compounds may carry an inert substituent such as an alkyl group.

The cyclopentadiene compounds having an olefinically unsaturated group or glycidyl group are prepared as will be described hereinafter.

For example, cyclopentadienyl compounds substituted by an alkenyl group or glycidyl group can be prepared easily by reacting cyclopentadiene with an alkali metal such as sodium in a suitable solvent, for example, tetrahydrofuran, pentahydropyran, dioxane or a mixture thereof with an aromatic hydrocarbon, to form an alkali metal salt of cyclopentadiene and then reacting the salt directly or indirectly with an alkenylating agent such as an alkenyl halide or a glycidylating agent such as a glycidyl halide. Alkenyl or glycidyl esters of cyclopentadienecarboxylic acid are prepared by the alkali salt of cyclopentadiene with carbon dioxide to form cyclopentadienecarboxylic acid and then subjecting the acid to transesterification reaction with an alkenyl or glycidyl ester of a fatty acid. Other cyclopentadiene compounds can be prepared according to a similar manner.

The cyclopentadiene compounds having an olefinically unsaturated group or glycidyl group thus obtained are readily dimerized by heating at a temperature, for example, up to 140°C. to form dicyclopentadiene compounds having two olefinically unsaturated groups or glycidyl groups. The dicyclopentadiene compounds having two olefinically unsaturated groups or glycidyl groups may be homopolymerized but are preferably copolymerized with other copolymerizable monomers to form cross-linked copolymers. Such copolymerizable monomers include, for example, olefins such as ethylene, propylene and butylene; dienes such as butadiene and isoprene; styrenes such as styrene itself, α-methylstyrene, and o-, m- and p-methylstyrene; unsaturated carboxylic acids or esters thereof such as acrylic acid, methacrylic acid, methyl acrylate and ethyl methacrylate; vinyl esters such as vinyl acetate and vinyl propionate; halogenated olefins such as vinyl chloride, vinyl fluoride and vinylidene chloride; and olefine oxides such as ethylene oxide and propylene oxide. Besides these, any of the copolymerizable monomers can be employed unless it affords a thermosetting plastic when homopolymerized. As catalysts for the copolymerization, there can be used adequately cationic catalysts, anionic catalysts, complex catalysts or radical initiators conventionally used for the polymerization reaction of this type.

During this polymerization reaction, the dicyclopentadiene rings may be cleaved to give polymers or copolymers soluble in solvents.

Another process for producing the cross-linked polymers or copolymers comprises reacting an alkali metal salt of cyclopentadiene with a halogenomethylated polyether obtained by polymerization or copolymerization of an epihalohydrin to form a linear polymer having pendant cyclopentadiene rings and then heating the linear polymer at temperatures up to 150°C to effect cross-linking.

The polymers or copolymers of an epihalohydrin used as starting material are prepared in a conventional manner by subjecting an epihalohydrin either alone or in mixture with one or more of the comonomers selected from the group consisting of an alkylene oxide and a cyclic ether to bulk polymerization reaction or solution polymerization reaction conducted at a reaction temperature of from room temperature to 50°C for at least 20 minutes in the presence of a catalyst system consisting of an alkyl metal such as diethylzinc or alkylaluminum and water. The alkylene oxide as the comonomer includes ethylene oxide, propylene oxide, styrene oxide, etc., and the cyclic ether includes tetrahydrofuran, oxetane, etc. The linear polymers or copolymers having pendant cyclopentadienyl groups are obtained by dissolving the polymer or copolymer of an epihalohydrin obtained as above in a suitable organic solvent, e.g., tetrahydrofuran or a mixture of tetrahydrofuran and an aromatic hydrocarbon such as benzene, toluene or the like, and adding dropwise to the solution an alkali metal compound of cyclopentadiene at a temperature not exceeding 30°C. In this case, the concentration of the polymer or copolymer in the solvent is selected within the range of at most 5% by weight, preferably within the range of 1.0–3.0% by weight.

A polyether having a recurring unit of the formula:

Wherein:

n is zero or a positive integer of at least 1, is thus obtained.

This polyether is a new self-curable polymer which, just after production, is in the form of liquid or unvulcanized rubber but permits a mutual reaction between the pendant cyclopentadiene rings invicinal molecules to form a cross-linking structure, thus resulting in a rubbery elastomer.

Polymers or copolymers of this invention are excellent in chemical resistance and dimensional stability and are insoluble in organic solvents, similar to conventional thermosetting plastics but, when heated at a predetermined temperature above 150°C, for example, higher than 210°C as to styrene copolymers, higher than 150°C as to butadiene copolymers, and higher than 180°C as to ethylene copolymers, the cross-linking structure is degraded to make the compounds fluid and, consequently, the compounds in this state can readily be molded by any desired means such as injection molding, extrusion molding and cast molding. The plastics molded as described above are gradually cooled to form the cross-linking structure again whereby they are no longer soluble in organic solvents such as benzene, toluene and decalin.

Through the molding temperature to be adopted in the shaping process of this invention depends on the kind of the main molecular chain, it is usually within the range of 150°–400°C and preferably 200°–300°C.

The moldings thus produced are excellent products which are free from defects of conventional thermoplastic plastics but have almost all of the merits of thermosetting plastics.

Below is an example of a preferred embodiment of the shaping process of this invention. About 10 grams of powdery cross-linked polymer obtained by copolymerization of methallylcylopentadiene dimer and butadiene in an equimolar proportion were molded with an injection molder under the conditions of 700 kg/cm² injection pressure, 200°C cylinder temperature and 80°C metal die temperature.

The molding thus produced was very rigid, had properties comparable with those of thermosetting plastics, and was insoluble in a variety of organic solvents.

The fact that cross-linkages in the cross-linked copolymer of this invention cleave at a certain temperature or high temperatures is understood fromthe phenomenon that the copolymer becomes soluble in organic solvents such as benzene or toluene and also from a thermogram obtained with a differential thermal analyzer.

Figure 1:
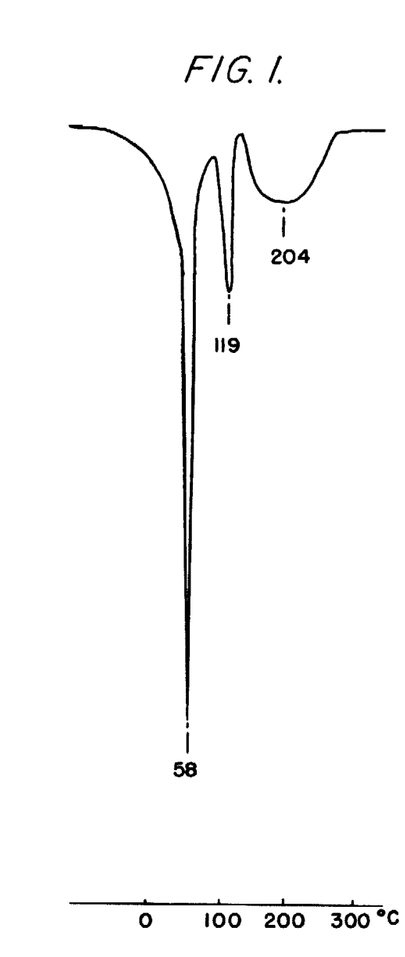
Figure 2:
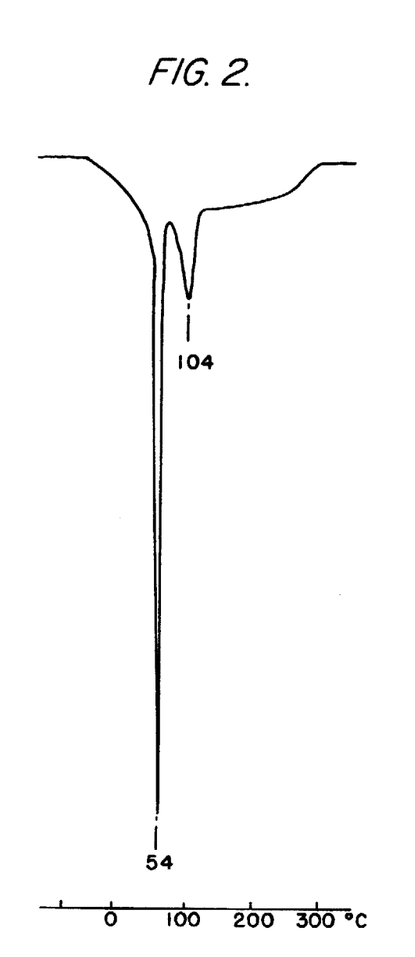

FIG. 1 is a thermogram obtained by using a methallylcyclopentadiene dimer/butadiene (2:1) copolymer and FIG. 2 is a thermogram of polybutadiene.

In FIG. 1, the heat absorption peak at 58°C is coincident with the primary transition point of a solid, and that at 119°C is conicident with the crystal melting point of transpolybutadiene. A moderate heat absorption peak at temperatures from 132°C to 287°C is not found in the thermogram of polybutadiene shown in FIG. 2 and is understood to be based on the thermal cleavage of dicyclopentadiene rings. According to the thermograms, the lower limit of the heating temperature to be used in the shaping process of this invention can be easily found. Though the heating temperture in this invention depends on the polymers or copolymers to be employed, it is readily selected by obtaining the teminal point of the heat absorption peak due to cleavage of dicyclopentadiene rings shown in the thermorgram and simultaneously taking the decomposition point of the polymer into consideration.

As the polymers or copolymers of this invention cross-linked through dicyclopentadiene rings possess such a peculiar property that they become thermoplastic above a certain temperature in spite of their three-dimensional network structure, they can be utilized as thermoplastic plastics in various fields of industry. The linear polymers or copolymers having pendant cyclopentadiene rings produced as precursor of the thermoplastic plastics can widely be utilized as self-curable plastics in the fields of rubber industry and the machinery industry for manufacturing various machinery parts.

This invention will be illustrated more in detail by way of examples which are not intended to limit the scope of this invention.

EXAMPLE 1

A. Synthesis of Allylcyclopentadiene Dimer

In 1 liter four-necked flask provided with a gas inlet, a condenser and an agitator were placed about 200 ml. of xylene and 46 g. (2 gram-atom) of metallic sodium. The charge was heated under agitation to pulverize sodium. After cooling, the xylene was removed and 500 ml. of tetrahydrofuran were added. Then, 180 ml. (about 2 mols) of cyclopentadiene were added dropwise to the mixture through a dropping funnel at temperatures lower than 30°C whereby generation of hydrogen gas was observed. After the addition of cyclopentadiene, the mixture was continuously agitated for a while, and then 187 mol of allyl bromide were added dropwise thereto with the reaction temperature being kept at 10°-20°C. After completion of the addition, the reaction product was filtered to remove the formed sodium chloride and then subjected to distillation under reduced pressure to obtain 74 g. of allylcyclopentadiene. The yield was 30%.

Allylcyclopentadiene thus obtained were heated at 100°C for 1 hour, whereby more than 80% of each compound was dimerized.

B. Preparation of Cross-linked Copolymer

Into a pressure-resistant gas reactor, 185 ml. of toluene, 4 millimols of ethyl aluminium dichloride and 1 millimol of vanadium oxytrichloride were charged and the mixture was agitated at 20°C to produce a catalyst. To the catalyst was added 10 ml. (9.60 g) of the methallylcyclopentadiene dimer which was produced in the above (A) and 12.20 g. of butadiene and the mixture was polymerized at 20°C for 2.5 hours. The reaction was stopped by the addition of methanol containing a small amount of hydrochloric acid. The copolymer was taken up in a large amount of methanol and filtered. The copolymer was dried under pressure to obtain 10.0 g. of white powdery copolymer. The copolymer thus produced was recognized to have cross-linkages as it was insoluble in hot toluene. (It was not completely cross-linked, as =CH₂ radicals were observed infrared absorption spectrum.) The copolymer was subjected to the test using a flow tester with 170 kg. load and a nozzle having a diameter of 1 mm whereby the copolymer began to flow at 150°C.

The copolymer was analyzed with a differential thermal analyzer (DSC) to obtain a thermogram shown in FIG. 1 wherein the heat absorption peak at 50°C is the primary transition point of a solid and the peak at 119°C is the melting point of the crystal of transpolybutadiene. [See, G. Natta, et al.: Chim. Ind. (Milano) Vol. 47, p. 716 (1965).] The heat absorption peak from 132°C to 287°C was not seen in the thermogram of homopolymer of butadiene shown in FIG. 2 and was recognized to be the heat absorption peak due to thermal cleavage of dicyclopentadiene. The heat absorption peak was confirmed not to result from decomposition of the copolymer by a thermobalance.

Figure 3:
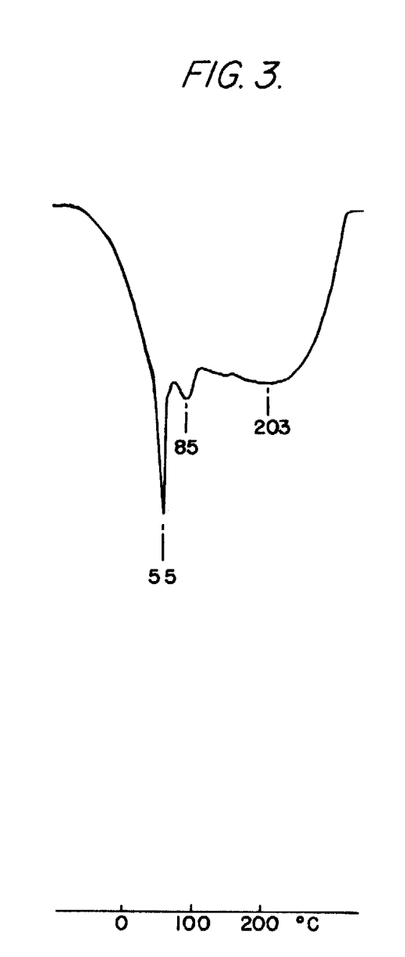

The copolymer was heated up to 280°C, cooled to room temperature, and again heated. The thermogram in this case is shown in FIG. 3. The heat absorption peak due to thermal cleavage of dicyclopentadiene was observed at the same temperature as in FIg. 1. This means that cross-linkage, once cleaved, was formed again. According to these facts, it was found that a cross-linked copolymer was formed, fluidized on heating as in the case of thermoplastic copolymers and then cross-linked again.

EXAMPLE 2

Into the same reactor used in Example 1 were charged 180 ml. of toluene, 4 mg. of ethyl aluminium dichloride and 1 millimol of vanadium oxytrichloride to prepare a catalyst. 14.4 grams of the allylcyclopentadiene dimer produced in a manner similar to that described in Example 1 (A) and 18.6 grams of butadiene were added and subjected to polymerization at 20°C for 2.5 hours. The product was similarly treated as in Example 1 to obtain 8.2 grams of a copolymer. The copolymer was insoluble was described in Example 1 but fluid on heating and gave the thermogram similar to that in Example 1.

EXAMPLE 3

In 300 ml. two-necked flask were placed 200 ml. of heptane and 7.84 g. of the allylcyclopentadiene dimer produced in a manner similar to that described in Example 1 (A). The polymerization took place immediately after adding 2 millimol of diethyl aluminium chloride and 1 millimol of vanadium oxytrichloride as catalyst while blowing ethylene into the mixture at 20°C, resulting in the formation of a copolymer in a suspended state. The polymerization was carried out for 1.5 hours at 20°C and the polymer produced was precipitated by the addition of methanol containing a small amount of hydrochloric acid. The precipitate was filtered and dried to obtain 12.2 g. of a while copolymer. The product was not a cross-linked copolymer as it was soluble in decalin at 130°C. However, it became insoluble by heating at 150°C for 15 minutes, and began to flow at 175°C by a flow tester with 300 kg. load and a nozzle having a diameter of 1 mm. In the thermogram of the heat-treated copolymer, a heat absorption peak was observed at 150°C, besides the melting point of polyethylene, which coincided with the heat absorption peak of the copolymer shown in Example 2.

EXAMPLE 4

A. Synthesis of Vinyl Cyclopentadienecarboxylate Dimer

Metallic sodium was reacted with cyclopentadiene as described in Example 1 (A) and the reaction product was poured over dry ice whereby the reaction immediately took place to form sodium salt of cyclopentadienecarboxylic acid. The yield was about 100%.

The sodium cyclopentadienecarboxylate thus obtained was hydrolyzed with acid to obtain cyclopentadienecarboxylic acid.

110 grams (1 mol) of dry cyclopentadienecarboxylic acid and 860 g. (10 mols) of vinyl acetate were allowed to react under reflux for 2 hours in the presence of a catalyst consisting of mercury acetate and sulfuric acid. After the end of the reaction, unreacted vinyl acetate and formed acetic acid were removed from the extract to obtain vinyl esters of cyclopentadienecarboxylic acid with a rough yield of 90%. The product was heated at 130°-150°C to produce vinyl cylopentadienecarboxylate dimer.

B. Preparation of Cross-linked copolymer

Into a 30 ml. ampoule were charged 10 ml. of styrene and vinyl cyclopentadienecarboxylate dimer obtained in Referential Example. The ampoule was closed under reduced pressure and put in a thermostat kept at 150°C whereby almost all of the dimer was converted into vinyl cyclopentadienecarboxylate. After polymerizing at 150°C for 2 hours, the produced copolymer was taken out. The copolymer was soluble in benzene at room temperature and precipitated by the addition of methanol. After filtering, the precipitate was dried under reduced pressure to obtain 7.63 g. of a copolymer. According to the DSC thermogram of the copolymer, it was not recognized to be homopolystyrene. A heat absorption peak was seen at temperatures of 200°-270°C. The peak appeared as cyclopentadiene was dimerized on heating and began to cleave at 200°C.

EXAMPLE 5

A. Synthesis of Methallylcyclopentadiene Dimer

In an analogous manner to that described in Example 1 (A) except that 192 ml of methallyl chloride was used in place of 187 ml of allyl bromide in Example 1 (A) was repeated to obtain 144 g of methallylcyclopentadiene in a yield of 60%.

Methallylcyclopentadiene thus obtained was heated at 100°C for 1 hour to obtain its dimer in a yield of 80% or higher.

B. Preparation of Cross-linked Copolymer

Into 200 cc two-necked flask were charged 94 ml. of toluene and 4.80 g. of methallylcyclopentadiene dimer obtained in the above (A). To this mixture was then added 91.5 grams of isobutylene with the temperature being kept at −78°C. 0.5 millimol of ethyl aluminum dichloride and 0.25 millimol of vanadium oxytrichloride were added to initiate polymerization. After continuing the polymerization at −78°C for 5 hours, the product was precipitated by the addition of methanol and dried to obtain 65.0 g. of a copolymer which was a cross-linked copolymer insoluble in benzene.

EXAMPLE 6

50.5 milliliters of styrene, 3.65 g. of cyclopentadienecarboxylate dimer produced in a manner similar to that described in Example 4 (A), 100 ml. of water, 1.5 g. of sodium laurate and 0.25 g. of potassium persulfate were subjected to emulsion polymerization reaction at 30°-40°C for 5.5 hours to obtain 39.6 g. of a copolymer. In elementary analysis, the copolymer was found to obtain 5.6% vinyl cyclopentadienecarboxylate unit. The copolymer was understood to have cross-linkages, as it was insoluble in hot benzene.

The copolymer was subjected to a fluid test using a Koka-type flow tester. The copolymer began to flow at 210°C under the conditions of 170 kg. load, 1 mm of the nozzle diameter and 6°C/min. of the temperature elevating rate, and entirely flowed at 295°C. The flowing copolymer was taken out and cooled whereby it again became insoluble in hot benzene.

EXAMPLE 7

185 milliliters of toluene, 9.80 g. of methallylcyclopentadiene dimer produced in a manner similar to that described in Example 5 (A) and 12.2 g. of butadiene were polymerized in the presence of a catalyst consisting of 4 millimols of ethyl aluminum dichloride and 1 millimol of vanadium oxytrichloride at 20°C for 2.5 hours to obtain 10.0 g. of a copolymer which was insoluble in hot toluene. The copolymer was subjected to a flow test under the same conditions as described in Example 1 whereby it began to flow at 150°C and entirely flowed at 220°C. The flowing copolymer was collected and cooled whereby it became again insoluble in hot toluene.

EXAMPLE 8

To 90 ml. of n-heptane were added as catalyst 2 millimols of diethyl aluminum chloride and 1 millimol of vanadium oxytrichloride, 9.8 g. of allylcyclopentadiene dimer obtained in a manner similar to that described in Example 1 (A) were then added to the mixture and ethylene was blown thereinto. The polymerization was carried out at 25°C for 1 hour to produce 7.8 g. of a copolymer which was soluble in decalin while hot (130°C). When the copolymer was heated at 150°C for 15 minutes and cooled, it became insoluble in decalin. The heat-treated copolymer was subjected to a flow test under the same conditions as described in Example 1 (except using 300 kg. load) whereby it began to flow at 180°C and entirely flowed at 212°C. The flowing copolymer was collected cooled whereby it became again insoluble in decalin (at 130°C).

EXAMPLE 9

A. Preparation of a Polymer of Epichlorohydrin

Into a three-necked flask which had been purged of air by argon were charged in turn epichlorohydrin which had been dehydrated and purified by calcium hydride, n-heptane, water and diethylzinc to conduct polymerization of epichlorohydrin.

After the lapse of a predetermined reaction time, the polymerization mixture was poured into a large excess of a methanol/aqueous hydrochloric acid mixture to precipitate an epichlorohydrin polymer which was then sufficiently washed and dried under reduced pressure.

The polymerization conditions and results were as indicated in the following Table 1.

TABLE 1

| Epichlorohydrin (mol) | n-Heptane (ml) | Water (m-mol) | Diethylzinc (m-mol) | Temperature (°C) | Time (Hr) | Yield of Polymer (g) |
|---|---|---|---|---|---|---|
| 0.5 | 40 | 2 | 2 | Room Temp. | 12 | 0.0 |
| 0.5 | 40 | 5 | 5 | Room Temp. | 12 | 19.0 |
| 0.5 | 40 | 10 | 10 | Room Temp. | 12 | 11.0 |

B. Preparation of a Polymer Having pendant Cyclopentadiene Rings

The epichlorohydrin polymer obtained in (A) was extracted with tetrahydrofuran by means of a Soxlay extractor to prepare a polymer solution of a polymer concentration of 3.0% by weight. A predetermined amount of the polymer solution was charged into a flask which had been purged of air argon, a 0.005 mol % solution of cyclopentadienylsodium in tetrahydrofuran was then added dropwise thereto and the mixture was maintained at temperatures of 0° to 5°C for 3 hours to effect reaction. The reaction mixture was then concentrated and poured into a large excess of water to obtain a precipitate which was sufficiently washed with water and then with methanol and dried under reduced pressure.

The results of the elementary analysis on the reaction product thus obtained are summarized in the following Table 2. The results summarized in Table 2 indicate that the chlorine content of the starting polymer decreased with the reaction and that there occurred reaction between chlorine atoms in the polymer and cyclopentadienyl sodium.

TABLE 2

| Amount of Charged C.P.-Na* (mol %, Based on Cl in the Polymer) | Elementary Analysis (% by Weight) | | | Cyclopentadiene Ring Content** (mol % of reaction Product) |
|---|---|---|---|---|
| | C | H | Cl | |
| 0*** | 38.5 | 5.4 | 33.3 | 0 |
| 2.0 | 39.2 | 5.4 | 32.2 | 0.6 |
| 6.0 | 38.9 | 5.4 | 30.1 | 1.8 |
| 10.0 | 36.5 | 5.0 | 31.5 | 3.0 |
| 14.0 | 41.4 | 5.4 | 31.2 | 4.2 |

\* Cyclopentadienylsodium
\*\* Calculated based on the C and Cl contents of reaction product determined by elementary analysis
\*\*\*Starting polymer (epichlorohydrin polymer).

Figure 4:
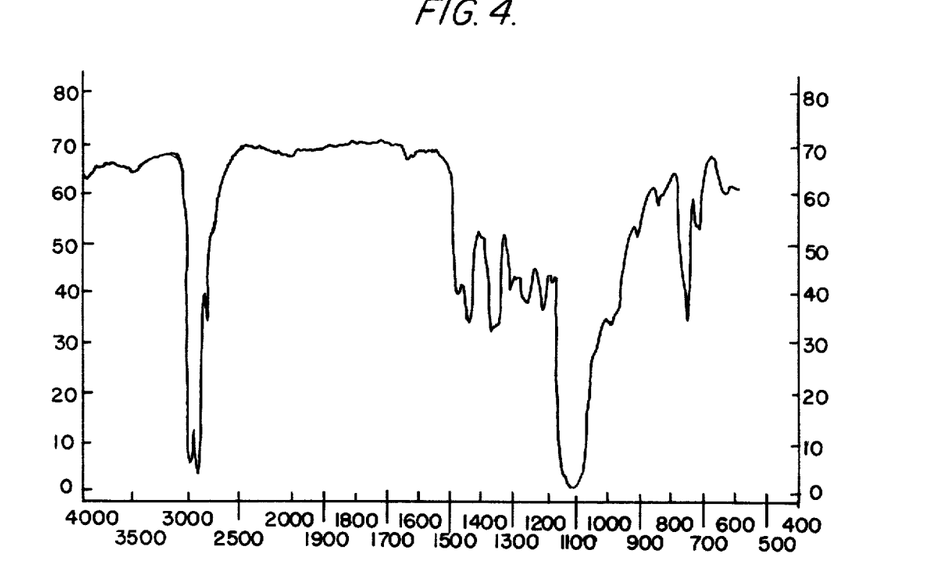
Figure 5:
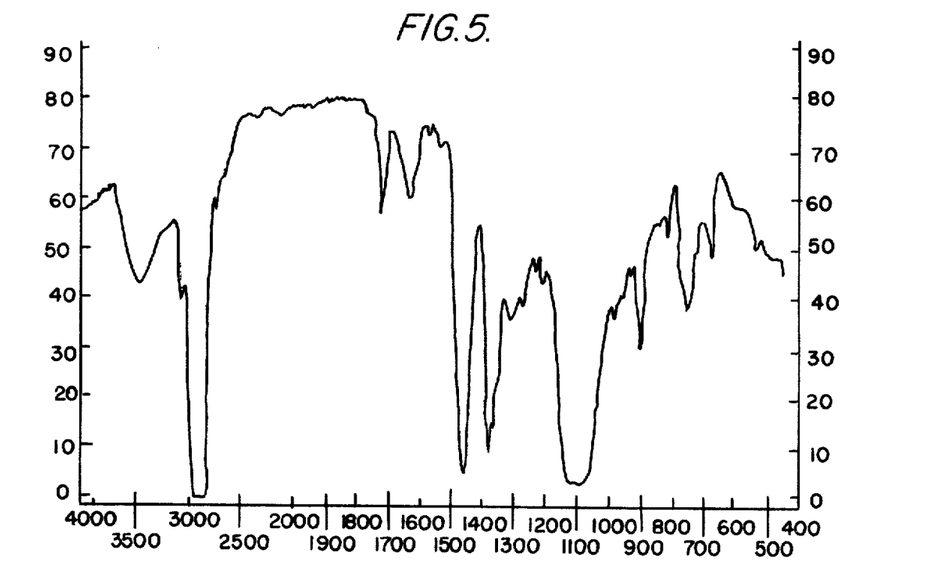

FIG. 4 is an infrared absorption spectrum of the epichlorohydrin polymer as a starting polymer and FIG. 5 is that of a reaction product obtained by reacting the epichlorohydrin polymer with 150 mol %, on the basis of chlorine contained in the polymer, of cyclopentadienylsodium. It will be noticed that in the infrared absorption spectrum of FIG. 5, there are absorption bands attributable to cyclopentadienyl group at 680 $cm^{-1}$, 810 $cm^{-1}$, 900 $cm^{-1}$, 1380 $cm^{-1}$, 1530 $cm^{-1}$, 1560 $cm^{-1}$ and 1630 $cm^{-1}$ which are absent in that of FIG. 4.

C. Preparation of Cross-linked Copolymer

Figure 6:
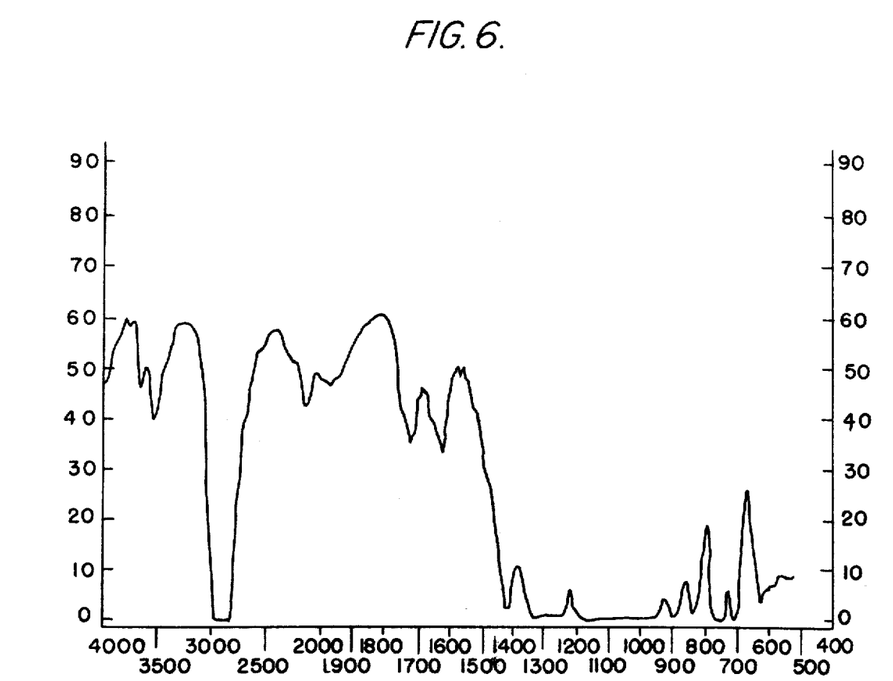

The reaction products having cyclopentadiene ring contents of 1.8, 3.0 and 4.2 mol %, respectively, were heated at 140°C for 1 hour to effect cross-linking reaction. As the results, there were obtained elastomers which were insoluble in solvents. The infrared absorption spectral diagram on the elastomers is shown in FIG. 6 whre the absorption peaks at 680 $cm^{-1}$, 810 $cm^{-1}$ and 1380 $cm^{-1}$ shown in FIG. 5 are disappeared and the peak at 900 $cm^{-1}$ becomes little. by these facts, it was confirmed that a dicyclopentadiene cross-linked structure was formed in the elastomer.

EXAMPLE 10

A. Preparation of a Copolymer of Epichlorohydrin and Propylene Oxide

Into a three-necked flask which has been purged of air by argon were charged in turn propylene oxide, epichlorohydrin, toluene, water and triethylaluminum and the charge was maintained at room temperature for 50 hours to conduct polymerization. The reaction mixture was then poured into a water/methanol/dilute hydrochloric acid mixture to precipitate a polymerizate which was dried overnight under reduced pressure to obtain a propylene oxide-epichlorohydrin copolymer.

The polymerization conditions and results were as indicated in the following Table 3.

TABLE 3

| Propylene oxide (m-mol) | Epichlorohydrin (m-mol) | Toluene (ml) | Triethylaluminum (m-mol) | Water (m-mol) | Yield of Copolymer (g) | Molecular Weight | Chlorine Content of Copolymer (g) |
|---|---|---|---|---|---|---|---|
| 208 | 51 | 10 | 2 | 2 | 1.2 | 1197 | 3.0 |
| 156 | 102 | 10 | 2 | 2 | 3.8 | 816 | 7.5 |
| 104 | 153 | 10 | 2 | 2 | 4.7 | 1324 | 12.4 |
| 52 | 204 | 10 | 2 | 2 | 6.9 | 1445 | 17.3 |

B. Preparation of Cross-linked Copolymer

The copolymer thus obtained was reacted with cyclopentadienylsodium at temperatures of 0° to 5°C for 3 hours in a similar manner as in Example 9 (B).

The resultant reaction product was confirmed to be a propylene oxide-epichlorohydrin copolymer having cyclopentadiene rings by the results of an elementary analysis and an infrared absorption spectrum analysis.

The copolymer was then heated at 140°C for 1 hour to effect cross-linking reaction. As a result, there was obtained a solventinsoluble elastomer in the form of a gel.

EXAMPLE 11

A. Preparation of Epichlorohydrin/Tetrahydrofuran/Ethylene Oxide Terpolymer

Into a flask which had been purged of air with argon were charged tetrahydrofuran, epichlorohydrin and ethylene oxide and the charge was, after the addition thereto of triethylaluminum and water, maintained at room temperature for 38 hours to conduct polymerization. The resulting tetrahydrofuran-epichlorohydrinethylene oxide terpolymer was precipitated by water, washed with water and dried under reduced pressure.

The polymerization conditions and results were as summarized in the following Table 4.

B. Preparation of Cross-linked Terpolymer

In 50 ml of tetrahydrofuran was dissolved 1.2 g of the resulting terpolymer having a chlorine content of 2.7% by weight. To the polymer solution were added dropwise 20 ml of a tetrahydrofuran solution containing 10 m-mol of cyclopentadienylsodium at temperatures of 0° to 10°C and, thereafter, the mixture was maintained at room temperature for 3 hours to conduct reaction.

After completion of the reaction, the reaction mixture was concentrated and poured into water to obtain a precipitate which was washed with water and dried under reduced pressure. The polymer thus obtained had a reduced chlorine content of 1.6% by weight. The polymer converted into a rubbery polymer when heated at 140°C under pressure of 5 Kg/cm² for 1 hour.

EXAMPLE 12

A. Preparation of Epichlorohydrin/Tetrahydrofuran Copolymer

Figure 7:
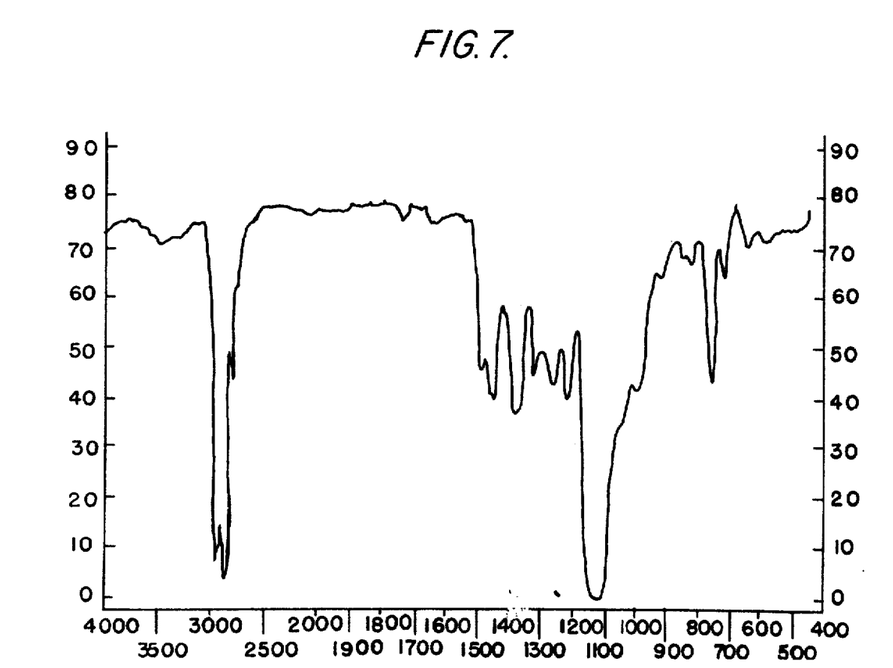

Into a three-necked flask of a capacity of 2 liters which had been purged of air by argon were charged 520 ml of epichlorohydrin, 390 ml of tetrahydrofuran and 160 ml of n-heptane. To the mixture were then added 32.5 m-mol of triethylaluminum and 22.8 m-mol of water. The charge was then maintained at room temperature for 20 hours to conduct polymerization. The polymerizate was precipitated in methanol, added to a dilute aqueous hydrochloric acid, washed repeatedly and thoroughly dried under reduced pressure to obtain an epichlorohydrin-tetrahydrofuran copolymer of a molecular weight of 3,150 in a yield of 434 g. The infrared absorption spectrum on the copolymer is shown in FIG. 7.

B. Preparation of a Copolymer Having Pendant Cyclopentadiene Rings

The copolymer obtained in said (A) was subjected to extraction with dried tetrahydrofuran by means of a Soxlay extractor to prepare a polymer solution having a concentration of 3.0%. To the solution was then added dropwise at temperatures of 0° to 5°C a tetrahydrofuran solution of cyclopentadienylsodium and the mixture was maintained at room temperature for 3 hours to conduct reaction. After completion of the reaction, the reaction mixture was concentrated and poured into water to obtain a precipitate which was thoroughly washed with methanol and dried under reduced pressure. The reaction conditions and results are summarized in the following Table 5.

TABLE 4

| Ethylene oxide (m-mol) | Epichlorohydrin (m-mol) | Tetrahydrofuran (m-mol) | Triethylaluminum (m-mol) | Water (m-mol) | Yield of Copolymer (g) | Molecular Weight | Elementary Analysis (% by weight) | | |
|---|---|---|---|---|---|---|---|---|---|
| | | | | | | | C | H | Cl |
| 100 | 200 | 247 | 1 | 1 | 8.3 | 2131 | 58.9 | 10.4 | 3.8 |
| 100 | 100 | 247 | 1 | 1 | 7.6 | 2356 | 60.8 | 10.7 | 2.7 |
| 100 | 50 | 247 | 1 | 1 | 4.1 | — | 59.8 | 10.7 | 2.2 |
| 100 | 10 | 247 | 1 | 1 | 2.3 | — | 61.5 | 10.9 | 1.0 |

TABLE 5

| Amount of Charged C.P.-Na (mol %, Based on Cl in the Polymer) | Elementary Analysis (% by Weight) | | | Cyclopentadiene Ring Content of Reaction Product** (mol %) |
|---|---|---|---|---|
| | C | H | Cl | |
| 0* | 51.0 | 7.9 | 17.2 | — |
| 76 | 52.0 | 7.8 | 16.2 | 4.9 |
| 113 | 53.0 | 7.6 | 16.5 | 16.5 |
| 151 | 54.7 | 7.5 | 15.2 | 7.3 |
| 181 | 55.4 | 7.3 | 13.3 | 11.7 |

*Indicating the starting polymer (epichloro-hydrin-tetrahydro-furan copolymer).

**Calculated on the basis of the C and Cl contents of the reaction product determined by elementary analysis.

C. Preparation of Cross-linked Copolymer

Three reaction products having cyclopentadiene ring contents of 7.3, 9.8 and 11.7 mol % separately pressed at temperatures of 145° to 150°C under a pressure of 50 Kg/cm² for 1 hour to form sheets. The sheets were subjected to tests for determinination of physical properties, the results obtained being summarized in Table 6.

TABLE 6

| Sheet (cyclopentadiene Content mol %) | Tensile Modulus (Kg/cm$^2$) | | Tensile at Break (Kg/cm$^2$) | Elongation (%) | Young's Modulus (Kg/cm$^2$) |
| --- | --- | --- | --- | --- | --- |
| | 100% | 200% | | | |
| 7.3 | 0.81 | 1.15 | 1.36 | 290 | 10.8 |
| 9.8 | 1.77 | — | 2.55 | 143 | 24.7 |
| 11.7 | — | — | 5.38 | 75 | 68.9 |

What is claimed is:

1. A self-curing polyether characterized in that it contains recurring units of the general formula:

wherein A represents a lower alkylene group and $m$ represents zero or a positive integer of at least 1.

2. A process for producing the polyether of claim 1 which comprises reacting a polymer or copolymer of an epihalohydrin with an alkali metal compound of cyclopentadiene.

* * * * *